United States Patent
McGee et al.

(10) Patent No.: US 6,902,351 B1
(45) Date of Patent: *Jun. 7, 2005

(54) METHOD AND MEANS FOR REDUCING STRESS IN A PIVOT IRRIGATION PIPELINE

(75) Inventors: Ricky D. McGee, Gretna, NE (US); Dale A. Christensen, Arlington, NE (US)

(73) Assignee: Valmont Industries, Inc., Valley, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,454

(22) Filed: Jul. 6, 2004

Related U.S. Application Data

(63) Continuation-in-part of application No. 10/776,136, filed on Feb. 11, 2004.

(51) Int. Cl.[7] .................................................. B05B 3/00
(52) U.S. Cl. ........................................... 405/36; 239/728
(58) Field of Search ............................... 405/36, 40, 41; 239/728, 730, 731

(56) References Cited

U.S. PATENT DOCUMENTS

| | | | | |
|---|---|---|---|---|
| 4,074,783 A | * | 2/1978 | Arndt et al. | 239/728 |
| 5,435,495 A | * | 7/1995 | Davis | 239/728 |
| 6,036,122 A | * | 3/2000 | Gerdes et al. | 239/728 |

* cited by examiner

*Primary Examiner*—Frederick L. Lagman
(74) *Attorney, Agent, or Firm*—Thomte, Mazour & Niebergall; Dennis L. Thomte

(57) ABSTRACT

A method and means for reducing stress in a pivot irrigation pipeline by permitting the pipeline to be separated from the center pivot structure while maintaining the pipeline in alignment with the center pivot structure. The alignment assembly of this invention facilitates the reconnection of the pipeline to the center pivot structure when the irrigation system is going to be used to irrigate.

15 Claims, 6 Drawing Sheets

METHOD AND MEANS FOR REDUCING STRESS IN A PIVOT IRRIGATION PIPELINE

CROSS-REFERENCE TO RELATED APPLICATION

This is a continuation-in-part application of Petitioners' earlier application Ser. No. 10/776,136 filed Feb. 11, 2004, entitled "METHOD AND MEANS FOR REDUCING STRESS IN A PIVOT IRRIGATION PIPELINE".

BACKGROUND OF THE INVENTION

1. Field of the Invention

This invention relates to a method and means for reducing stress in a pivot irrigation pipeline and more particularly to a method and means for reducing stress in a pivot irrigation pipeline by allowing the pipeline to separate while maintaining the same in proper alignment to facilitate reconnection.

2. Description of the Related Art

Center pivot irrigation systems comprise a center pivot structure having an elongated water pipeline extending outwardly therefrom which is supported upon a plurality of spaced-apart drive towers. In many cases, the systems are quite long. During periods of non-use, when cooler temperatures are experienced, the long systems tend to contract which causes stress in the system which may result in component failure. If the pipeline is disconnected from the center pivot structure to reduce the stress in the system during periods of cooler temperatures, it is extremely difficult to align the pipeline with respect to the center pivot structure to reconnect the same. The method and means described in the co-pending application, Ser. No. 10/776,136 filed Feb. 11, 2004, represented a significant advance in the art and it is believed that the instant invention represents a further advance in the art.

SUMMARY OF THE INVENTION

A method and means is described for reducing stress in a pivot irrigation system by allowing the pipeline to separate from the center pivot structure during periods of cooler temperatures. The instant invention includes an alignment assembly which is secured to and extends between the center pivot structure and inner end of the pipeline. When the pipeline is disconnected from the center pivot structure and cooler temperatures are experienced, the alignment assembly permits the system to contract along its length and maintains the inner end of the pipeline in alignment with the center pivot structure to facilitate reconnection of the same when the system is going to be used to irrigate.

More particularly, the structure of this invention comprises a pivot support structure having an elongated irrigation pipeline supported upon a plurality of spaced-apart drive towers. The pivot support structure includes a generally vertically disposed pipe which is fluidly connected to a source of water, and a horizontally extending pipe portion at the upper end of the generally vertically disposed pipe. The inner end of the pipeline is fluidly connected to the horizontally extending pipe portion by means of a flex joint. The disconnect alignment assembly is operatively secured to and extends between the horizontally extending pipe portion and the inner end of the pipeline. The disconnect alignment assembly is adapted to maintain the inner end of the pipeline in engagement with the horizontally extending pipe portion when the inner end of the pipeline is connected from the horizontally extending pipe portion to reduce stress in the system during a period of time that the system will not be functioning and to facilitate the subsequent reconnection of the inner end of the pipeline to the horizontally extending pipe portion when the system is going to be used to irrigate.

The method of this invention comprises the following steps: disconnecting the inner end of the pipeline from the horizontally extending pipe portion of the pivot support assembly to permit the pipeline to separate from the pivot support assembly as the system contracts during cooler weather while maintaining the inner end of the pipeline in alignment with the horizontally extending pipe portion of the pivot support assembly to facilitate to the reconnection of the inner end of the pipeline to the horizontally extending pipe portion of the pivot support assembly when the system is going to be used to irrigate.

Although the preferred embodiment is to provide the disconnect assembly at the inner end of the pipeline, the disconnect assembly could be provided at one end of the drive towers or at any place in the pipeline.

It is therefore a principal object of the invention to provide a method and means for reducing stress in a pivot irrigation pipeline when cooler temperatures are experienced.

Yet another object of the invention is to provide a method and means for reducing stress in a pivot irrigation pipeline by allowing the pipeline to be separated from the center pivot structure while maintaining the same in alignment to facilitate subsequent reconnection.

Yet another object of the invention is to provide a novel method and means for reducing stress in a pipeline which may be easily retrofitted onto existing systems.

These and other objects will be apparent to those skilled in the art.

DETAILED DESCRIPTION OF THE INVENTION

Figure 1:
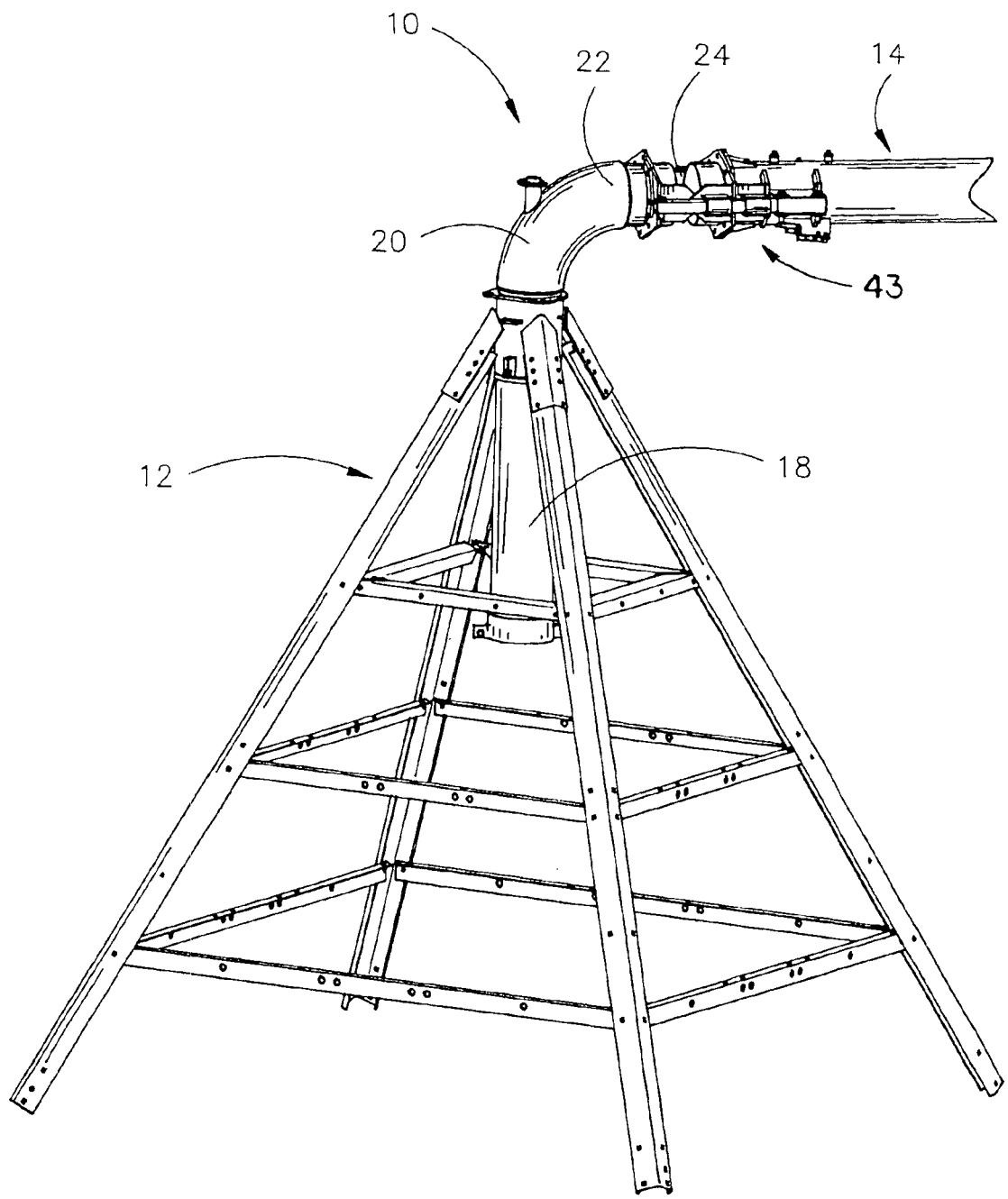
FIG. 1 is a perspective view of the apparatus of this invention.

In FIG. 1, the numeral 10 refers generally to a self-propelled pivot irrigation system including a center pivot structure 12 and an elongated water pipeline or boom 14 supported upon a plurality of spaced-apart drive towers in conventional fashion. Pivot structure 12 includes a vertically disposed pipe 18 which is in communication with a source of water. Normally, pipe 18 is provided with an elbow 20 at its upper end to define a horizontally extending pipe portion 22. Elbow 20 is rotatably secured, about a vertical axis, to the pipe 18 in conventional fashion. In most cases, pipe portion 22 has a flex joint assembly 24 at its outer end which connects the pipe portion 22 to the inner end of the pipeline 14 in a manner which permits the pipeline 14 to flex with respect to the pipe portion 22 as the system moves around the area being irrigated. The flexible boot which is a part of the flex joint assembly 24 and which connects the outer end of the pipe portion 22 to the inner end of the water pipeline 14 has not been shown for purposes of clear illustration.

Figure 2A:
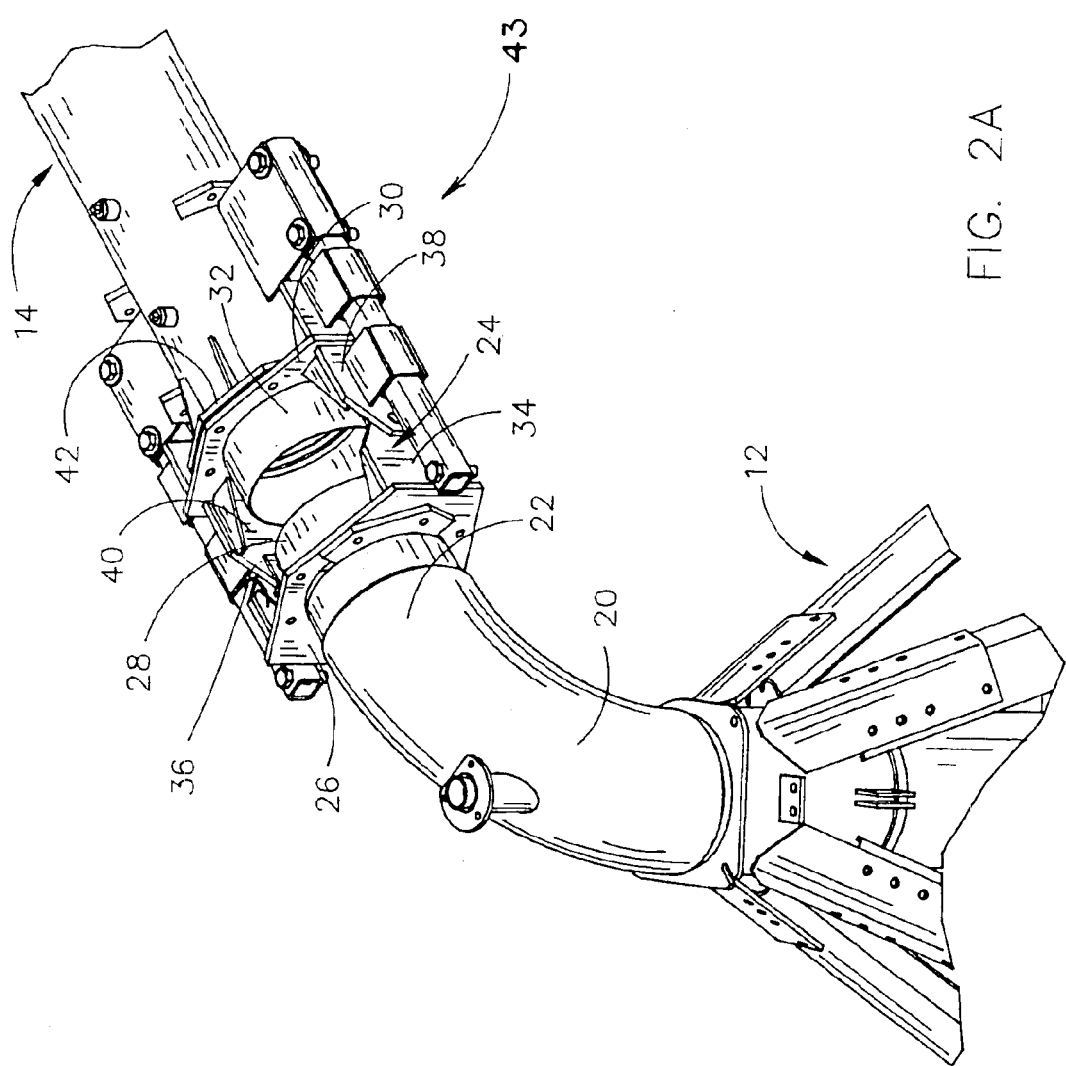
FIG. 2A is a perspective view of the apparatus of this invention.
Figure 2B:
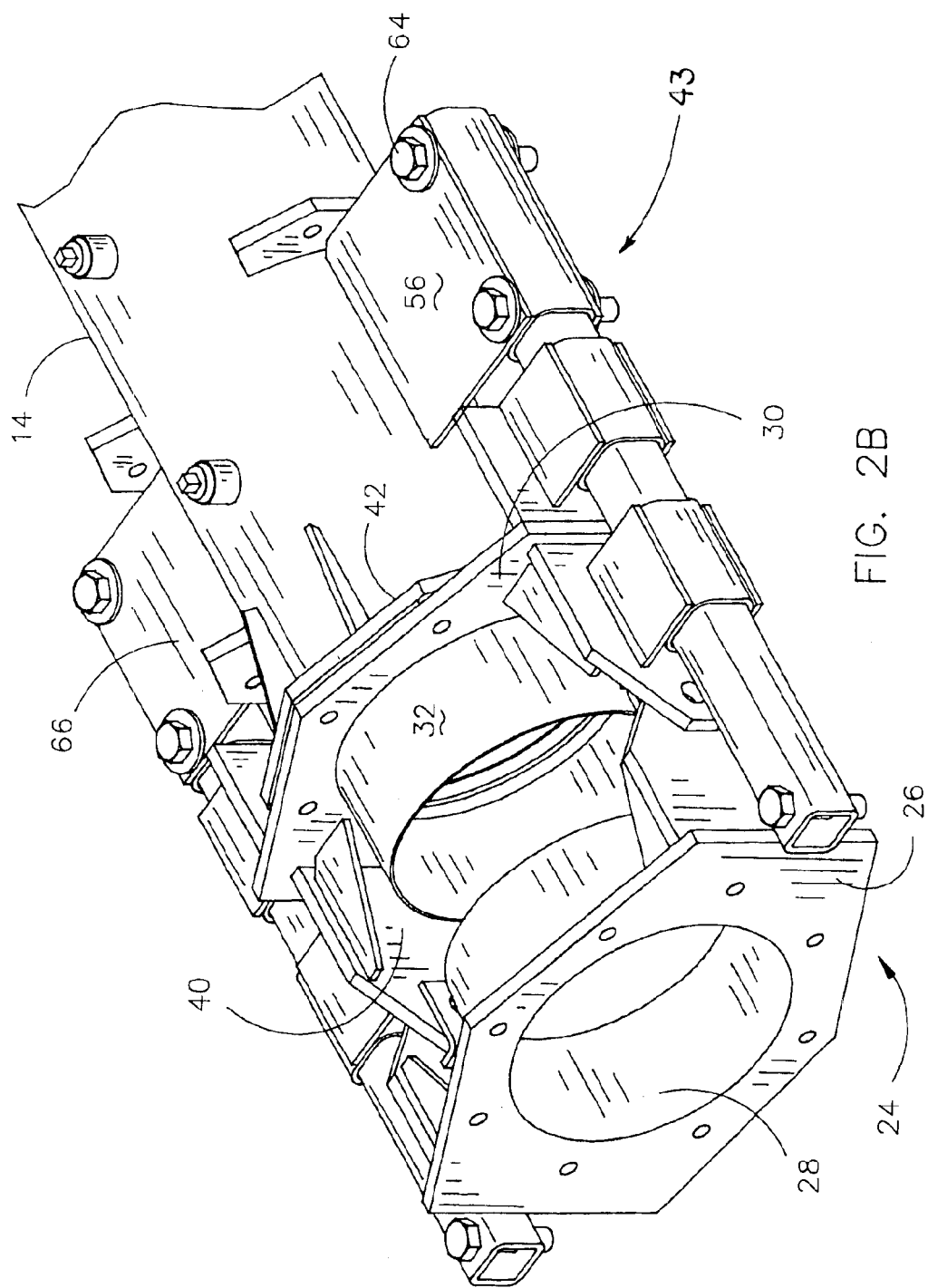
FIG. 2B is a view similar to FIG. 2A except that the view has been enlarged.

Flex joint assembly 24 includes an inner flange 26 having an outwardly extending tubular member 28 provided thereon as well as an outer flange 30 having an inwardly extending tubular member 32 provided thereon. Tubular members 28 and 32 normally have a flexible boot or the like extending therebetween in conventional fashion as stated above. Ears, brackets or hinge plates 34 and 36 are secured to the outer side of flange 26 and are pivotally connected to ears, brackets or hinge plates 38 and 40, which extend inwardly from flange 30 by bolts in conventional fashion. Flange 42 is provided at the inner end of pipeline 14 and is normally bolted to flange 30, as seen in FIG. 2. The disconnect assembly of this invention is referred to generally by the reference numeral 43. In the preferred embodiment, the disconnect assembly 43 is provided at the inner end of the pipeline as will be described hereinafter. However, the disconnect assembly 43 may be located outwardly of the center pivot such as at one of the drive towers or at any other location in the system. Further, in the preferred embodiment, a flex joint is utilized but the assembly may be used without a flex joint.

Collars or sleeves 44 and 46 are welded to the outer sides of hinge plates 38 and 40, respectively, by support plates at the upper and lower ends thereof, as seen in the drawings. Flange 30 is provided with outwardly extending plates 48 and 50 at the opposite sides thereof which have collars or sleeves 52 and 54 welded thereto, respectively. Plates 56 and 58 are secured to one side of the inner end of pipeline 14 and have a collar or sleeve 60 positioned therebetween and secured thereto by bolts 62 and 64. Plates 66 and 68 (not shown) are secured to the other side of the inner end of pipeline 14 and have a collar 70 positioned therebetween and secured thereto by bolts 72 and 74.

The outer end of tube 76 is received within collar 60 and is maintained therein by the bolts 62 and 64 extending therethrough. The outer end of tube 78 is received within collar 70 and is maintained therein by the bolts 72 and 74. The inner end of tube 76 is slidably received by the collars 44 and 52. The inner end of tube 76 has a bolt 80 extending therethrough which serves as a stop or limit. The inner end of tube 78 is slidably received by the collars 46 and 54. The inner end of tube 78 has a bolt 82 extending therethrough which serves as a stop or limit.

Figure 3:
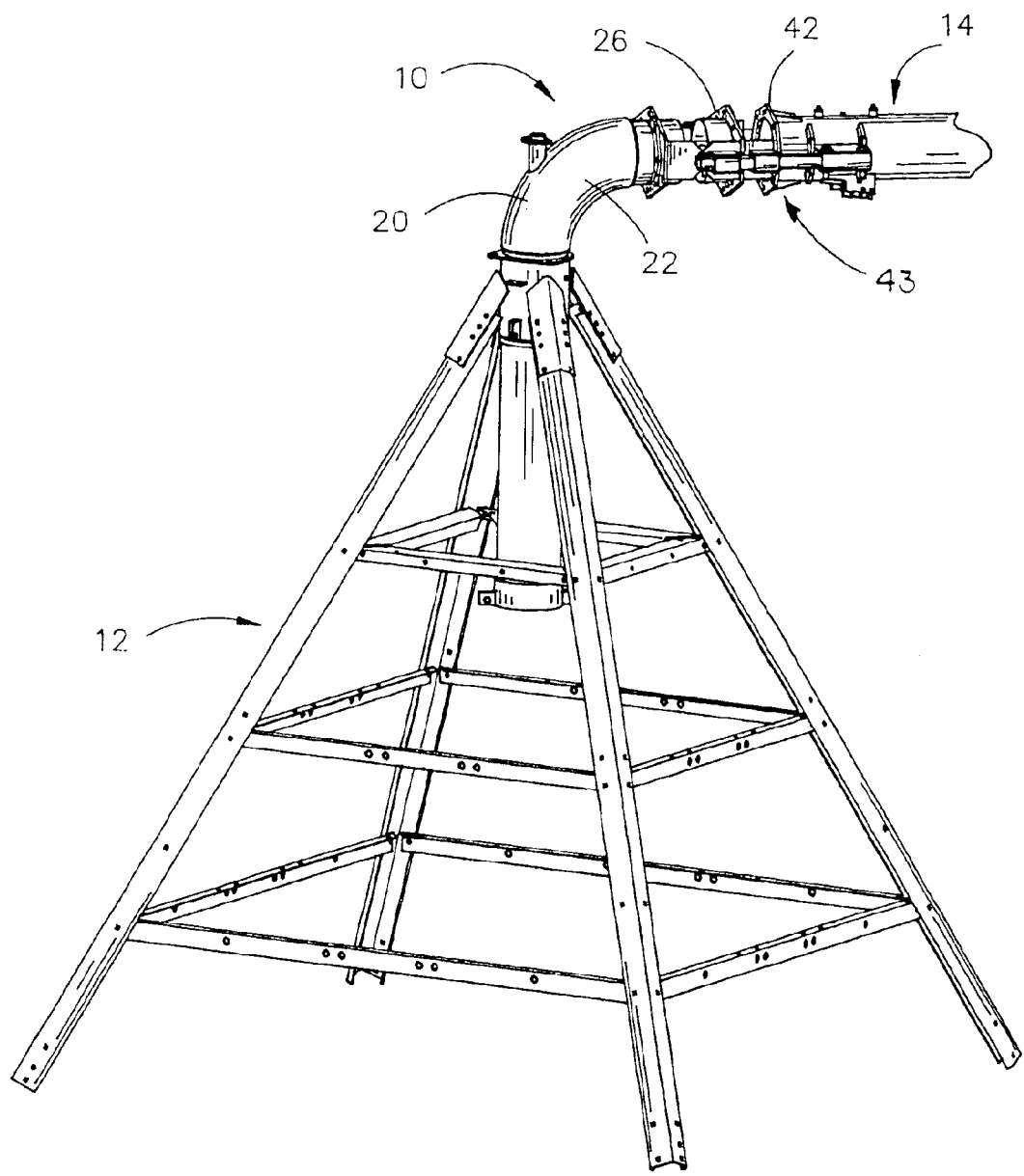
FIG. 3 is a view similar to FIG. 1 except that the pipeline has been disconnected from the center pivot structure and the pipeline has been moved away from the center pivot structure.
Figure 4A:
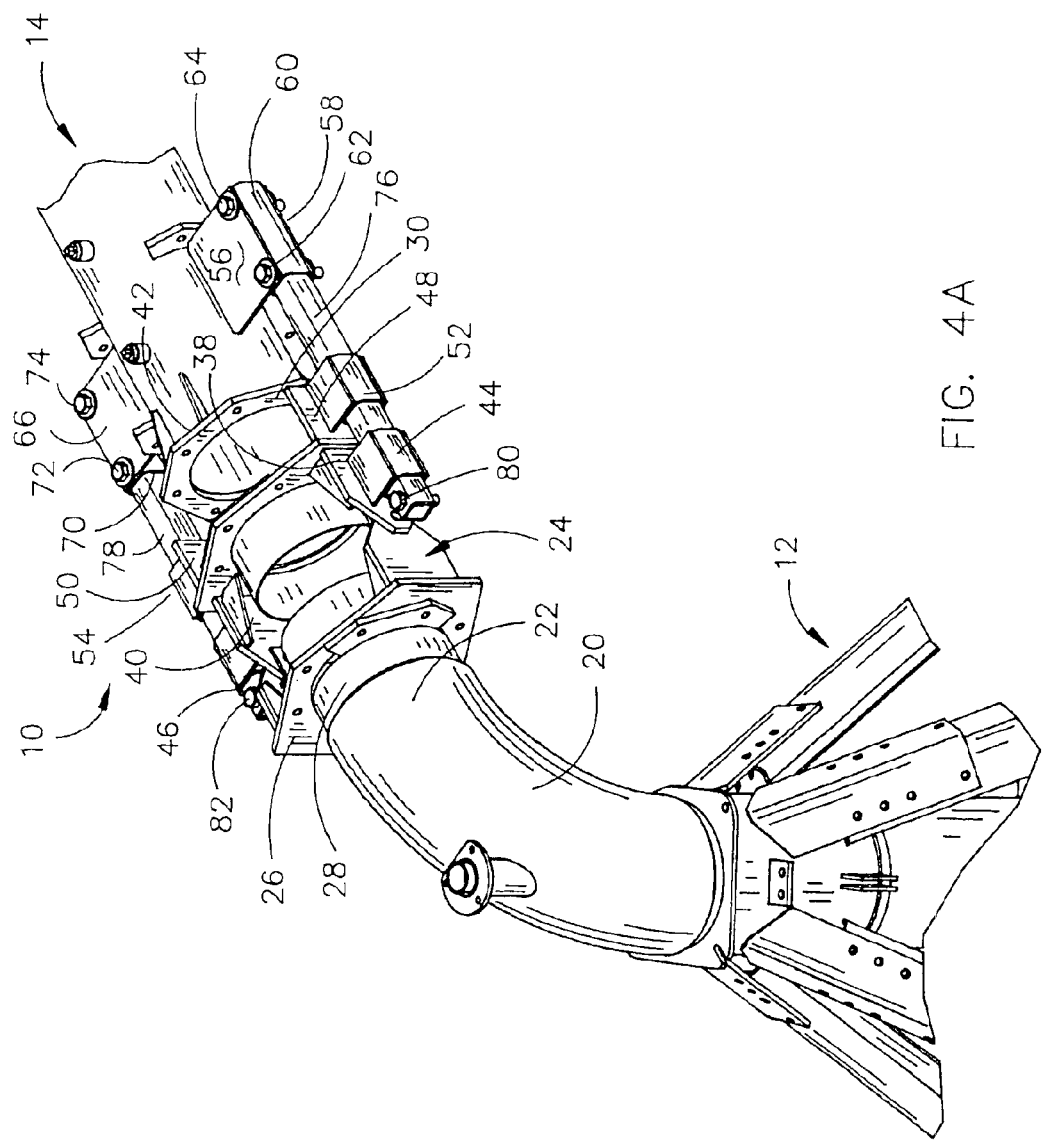
FIG. 4A is a perspective view of the apparatus of this invention in a disconnected position.
Figure 4B:
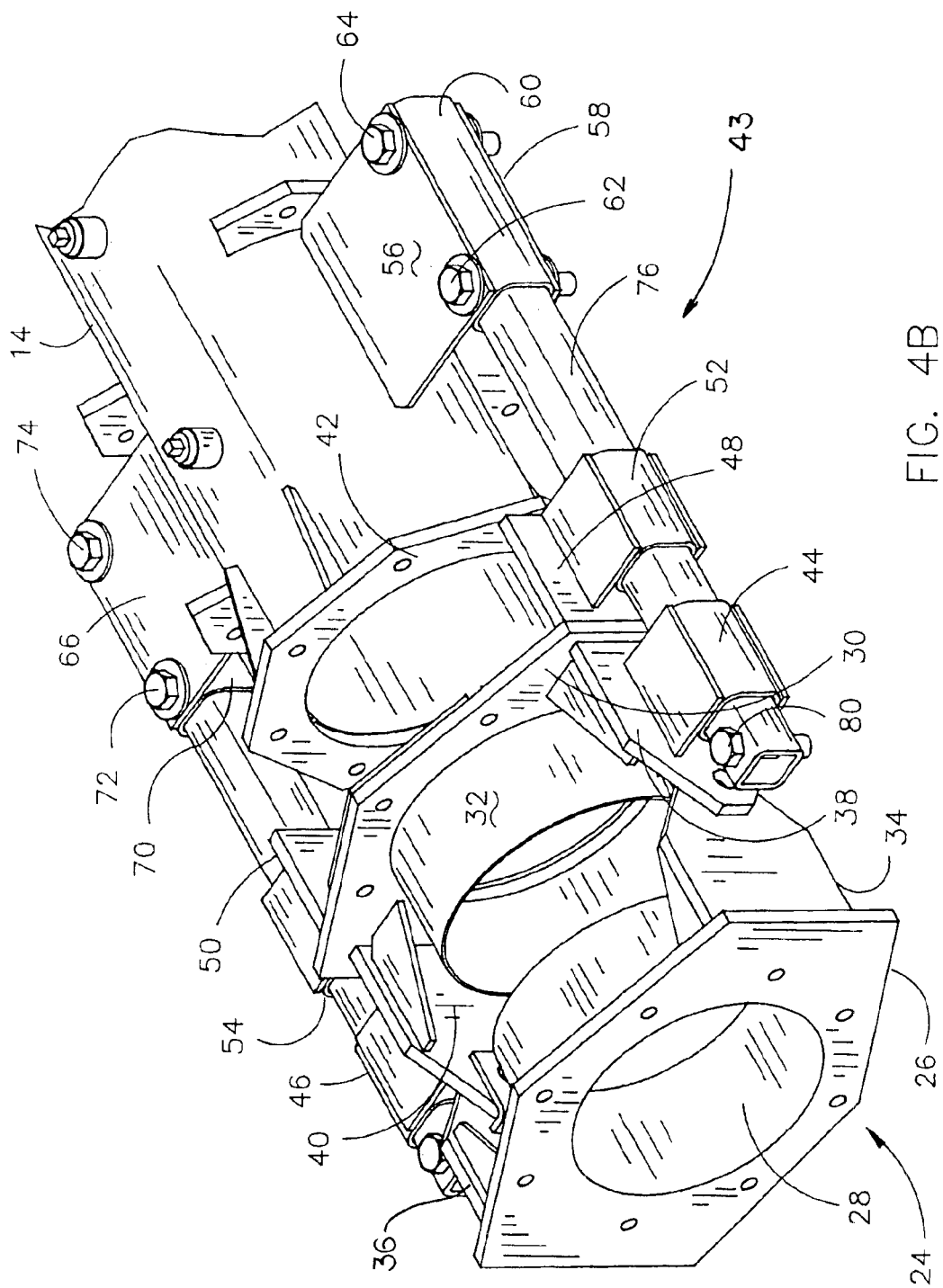
FIG. 4B is a view similar to FIG. 4A except that the view has been enlarged.

If the flanges 30 and 42 were to remain connected during periods of cooler weather, contraction of the system may cause stress in the machine resulting in possible component failure. The instant invention permits the inner end of the pipeline 14 to be disconnected from the pivot structure 12 during periods of cooler temperatures while permitting the pipeline 14 to be easily reconnected to the pivot structure when the machine is going to be used to irrigate. If cooler weather is anticipated, the flanges 30 and 42 are disconnected. As the system moves linearly outwardly along its length with respect to the center pivot structure, the tube 76 slidably moves outwardly with respect to collars 44 and 52 and the tube 78 slidably moves outwardly with respect to collars 46 and 54 from the position of FIGS. 1, 2 to the position of FIGS. 3, 4. The interaction of the tubes 76 and 78 with the collars 44, 52 and 46, 54, respectively, maintains the inner end of the pipeline 14 in alignment with the pipe portion 22 (FIGS. 3, 4). As temperatures increase, the machine moves linearly inwardly along its length so that the inner end of the pipeline 14 moves into registering alignment with the outer end of the flex joint 24 which facilitates the reconnection of the flanges 30 and 42. If a space exists between the flanges 30 and 42, a "come-a-long" or similar tool may be used to manually bring the flanges 50 and 42 together to reconnect the same.

Thus it can be seen that the invention provides a method and means for reducing the stress in an irrigation system during periods of cooler temperatures thereby preventing component failures in the system. The instant invention therefore accomplishes at least all of its stated objectives.

We claim:

1. The method of reducing stress in a center pivot irrigation system during a period of time that the system is not functioning and is experiencing cooler temperatures with the system having:
   a) a pivot support assembly including a horizontally extending pipe portion;
   b) an elongated irrigation pipeline, having inner and outer ends, supported upon a plurality of spaced-apart drive towers;
   c) the inner end of the pipeline being selectively removably connected to the horizontally extending pipe portion of the pivot support assembly; comprising the following steps:
   d) disconnecting the inner end of the pipeline from the horizontally extending pipe portion of the pivot support assembly;
   e) while maintaining the inner end of the pipeline in alignment with the horizontally extending pipe portion of the pivot support assembly to facilitate the reconnection of the inner end of the pipeline to the horizontally extending pipe portion of the pivot support assembly when the system is going to be used to irrigate.

2. The method of claim 1 wherein a support assembly is secured to and extends between the horizontally extending pipe portion and the inner end of the pipeline.

3. The method of claim 1 wherein a flex joint is provided on said horizontally extending pipe portion.

4. The method of reducing stress in a center pivot infringement irrigation system during a period of time that the system will not be operating having:
   a) a pivot support assembly including an upstanding pipe connected to a source of water;
   b) a horizontally extending pipe portion at the upper end of the upstanding pipe which is in fluid communication therewith;
   c) an elongated irrigation pipeline supported upon a plurality of spaced-apart driver towers and having inner and outer ends;
   d) the inner end of the pipeline being selectively removably fluidly connected to the horizontally extending pipe portion;
comprising the following steps:
   e) disconnecting the inner end of the pipeline from the horizontally extending pipe portion;
   f) while maintaining the inner end of the pipeline in alignment with the horizontally extending pipe portion to ease the reconnection of the inner end of the pipeline to the horizontally extending pipe portion.

5. The method of claim 4 wherein a support assembly is secured to and extends between the horizontally extending pipe portion and the inner end of the pipeline.

6. The method of claim 4 wherein a flex joint is provided on said horizontally extending pipe portion.

7. An irrigation system, comprising:

a pivot support structure;

an elongated irrigation pipeline supported upon a plurality of spaced-apart drive towers:

said pipeline having inner and outer ends;

said pivot support structure including a generally vertically disposed pipe fluidly connected to a source of water, and a horizontally extending pipe portion at the upper end of said generally vertically disposed pipe;

said inner end of said pipeline being fluidly selectively removably connected to said horizontally extending pipe portion;

a disconnect alignment assembly operatively secured to and extending between said horizontally extending pipe portion and said inner end of said pipeline;

said disconnect alignment assembly adapted to maintain said inner end of said pipeline in alignment with said pipe portion when said inner end of said pipeline is disconnected from said horizontally extending pipe portion to reduce stress in the system during a period of time that the system will not be functioning and to facilitate the subsequent reconnection of the inner end of the pipeline to the horizontally extending pipe portion when the system is going to be used to irrigate.

8. The irrigation system of claim 7 wherein a flex joint is operatively secured to said pipe portion.

9. An irrigation system, comprising:

a pivot support structure;

an elongated irrigation pipeline supported upon a plurality of spaced-apart drive towers;

said pipeline having inner and outer ends;

said pivot support structure including a generally vertically disposed pipe fluidly connected to a source of water, and a horizontally extending pipe portion at the upper end of said generally vertically disposed pipe;

a first pipe flange secured to the outer end of said horizontally extending pipe portion and having inner and outer ends;

a flex joint, having inner and outer ends;

said inner end of said flex joint being secured to said first pipe flange;

a second pipe flange secured to said outer end of said flex joint;

said second pipe flange having first and second sides;

a first sleeve secured to said first side of said second pipe flange;

a second sleeve secured to said second side of said second pipe flange;

a third sleeve secured to said first side of said second pipe flange outwardly of said first sleeve;

a fourth sleeve secured to said second side of said second pipe flange outwardly of said second sleeve;

said inner end of said pipeline having first and second sides;

a fifth sleeve secured to said first side of said inner end of said pipeline;

a sixth sleeve secured to said second side of said inner end of said pipeline;

a first elongated support having inner and outer ends;

a second elongated support having inner and outer ends;

said outer end of said first support being received by and secured to said fifth sleeve;

said outer end of said second support being received by and secured to said sixth sleeve;

said first support being slidably received by said first and third sleeves;

said second support being slidably received by said second and fourth sleeves.

10. An irrigation system, comprising:

a pivot support structure;

an elongated irrigation pipeline supported upon a plurality of spaced-apart drive towers;

said pipeline having inner and outer ends;

said pivot support structure including a generally vertically disposed pipe fluidly connected to a source of water, and a horizontally extending pipe portion at the upper end of said generally vertically disposed pipe;

a first pipe flange secured to the outer end of said horizontally extending pipe portion and having inner and outer ends;

a flex joint, having inner and outer ends;

said inner end of said flex joint being secured to said first pipe flange;

a second pipe flange secured to said outer end of said flex joint;

said second pipe flange having first and second sides;

a first sleeve secured to said first side of said second pipe flange;

a second sleeve secured to said second side of said second pipe flange;

a third sleeve secured to said first side of said second pipe flange outwardly of said first sleeve;

a fourth sleeve secured to said second side of said second pipe flange outwardly of said second sleeve;

said inner end of said pipeline having first and second sides;

a first elongated support having inner and outer ends;

a second elongated support having inner and outer ends;

said outer end of said first support being secured to said first side of said inner end of said pipeline;

said outer end of said second support being secured to said second side of said inner end of said pipeline;

said first support being slidably received by said first and third sleeves;

said second support being slidably received by said second and fourth sleeves.

11. An irrigation system, comprising:

a pivot support structure;

an elongated irrigation pipeline supported upon a plurality of spaced-apart drive towers;

said pipeline having inner and outer ends;

said pivot support structure including a generally vertically disposed pipe fluidly connected to a source of water, and a horizontally extending pipe portion at the upper end of said generally vertically disposed pipe;

a first pipe flange secured to the outer end of said horizontally extending pipe portion and having inner and outer ends;

a flex joint, having inner and outer ends;

said inner end of said flex joint being secured to said first pipe flange;

a second pipe flange secured to said outer end of said flex joint;

said second pipe flange having first and second sides;

a first sleeve secured to said first side of said second pipe flange;

a second sleeve secured to said second side of said second pipe flange;

said inner end of said pipeline having first and second sides;

a first elongated support having inner and outer ends;

a second elongated support having inner and outer ends;

said outer end of said first support being secured to said inner end of said pipeline;

said outer end of said second support being secured to said inner end of said pipeline;

said first support being slidably received by said first sleeve;

said second support being slidably received by said second sleeve.

12. The method of reducing stress in a center pivot irrigation system during a period of time that the system is not functioning and is experiencing cooler temperatures with the system having:

a) a center pivot support;

b) an elongated irrigation pipeline extending outwardly from the center pivot support and which is comprised of a plurality of pipe sections, bolted together in and end-to-end relationship, each of the pipe sections having inner and outer ends;

c) a plurality of spaced-apart drive towers supporting the irrigation pipeline;

comprising the following steps:

d) disconnecting the outer end of a pipe section from the inner end of a pipe section adjacent thereto;

e) while maintaining the inner end of the disconnected pipe section in alignment with the outer end of the disconnected pipe section to facilitate the reconnection of the inner end of the disconnected pipe section to the outer end of the disconnected pipe section when the system is going to be used to irrigate.

13. The method of claim 12 wherein a support assembly is secured to and extends between the outer end of the disconnected pipe section and the inner end of the disconnected pipe section.

14. An irrigation system, comprising:

a pivot support structure;

an elongated irrigation pipeline supported upon a plurality of spaced-apart drive towers;

said pipeline being comprised of a plurality of pipe sections, having inner and outer ends, connected together;

a disconnect alignment assembly operatively secured to and extending between the outer end of a first pipe section and the inner end of a second pipe section adjacent thereto;

said disconnect alignment assembly adapted to maintain said inner end of said second pipe section in alignment with said outer end of said first pipe section when said first and second pipe sections are disconnected from one another to reduce stress in the system during a period of time that the system will not be functioning and to facilitate the subsequent reconnection of the inner end of said second pipe section to the outer end of said first pipe section when the system is going to be used to irrigate.

15. An irrigation system, comprising:

a pivot support structure;

an elongated irrigation pipeline extending outwardly from said pivot support structure and being supported upon a plurality of spaced-apart drive towers;

said pipeline being comprised of a plurality of pipe sections, having inner and outer ends, connected together;

a first pipe flange secured to the outer end of a first pipe section;

a second pipe flange secured to the inner end of a second pipe section which is positioned outwardly of said first pipe section;

said second pipe flange having first and second sides;

a first sleeve secured to said first side of said first pipe flange;

a second sleeve secured to said second side of said first pipe flange;

a third sleeve secured to said first side of said first pipe flange outwardly of said first sleeve;

a fourth sleeve secured to said second side of said first pipe flange outwardly of said second sleeve;

a fifth sleeve secured to said second pipe section;

a sixth sleeve secured to said second pipe section;

a first elongated support having inner and outer ends;

a second elongated support having inner and outer ends;

said outer end of said first support being received by and secured to said fifth sleeve;

said outer end of said second support being received by and secured to said sixth sleeve;

said first support being slidably received by said first and third sleeves;

said second support being slidably received by said second and fourth sleeves.

* * * * *